United States Patent
Bando (10) Patent No.: US 10,793,463 B2
(45) Date of Patent: *Oct. 6, 2020

(54) GLASS PLATE SCRIBING APPARATUS (71) Applicant: Bando Kiko Co. Ltd., Tokushima-shi, Tokushima (JP)

(72) Inventor: Kazuaki Bando, Tokushima (JP)

(73) Assignee: BANDO KIKO CO., LTD., Tokushima-Shi, Tokushima (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/219,527

(22) Filed: Mar. 19, 2014

(65) Prior Publication Data
US 2014/0202301 A1    Jul. 24, 2014

Related U.S. Application Data (62) Division of application No. 13/257,114, filed as application No. PCT/JP2009/001680 on Apr. 10, 2009, now Pat. No. 9,593,035.

(51) Int. Cl.
*C03B 33/02* (2006.01)
*C03B 33/027* (2006.01)
(Continued)

(52) U.S. Cl.
CPC ............ *C03B 33/023* (2013.01); *B26D 3/085* (2013.01); *B28D 1/226* (2013.01); *B28D 5/0011* (2013.01);
(Continued)

(58) Field of Classification Search
CPC .. B26D 3/08; B26D 3/085; B28B 5/11; B28B 5/0011; C03B 33/033; C03B 23/023;
(Continued)

(56) References Cited

U.S. PATENT DOCUMENTS 2,812,579 A   11/1957  Arck
4,187,755 A    2/1980  Shirai
(Continued)

FOREIGN PATENT DOCUMENTS

EP    1 036 773 A2    9/2000
EP    2 014 623 A1    1/2009
(Continued)

OTHER PUBLICATIONS

Parent; U.S. Appl. No. 13/257,114, filed Sep. 16, 2011, Bando.
(Continued)

*Primary Examiner* — Clark F Dexter
(74) *Attorney, Agent, or Firm* — Nixon & Vanderhye P.C.

(57) ABSTRACT

A scribing apparatus includes a horizontal table on which a glass plate is placed and fixed under vacuum suction; a feed screw and a Y-axis control motor 6 for moving the table along a pair of guide rails under scribe numerical control; a guide rail device body installed above the table along an X-axis direction; a carriage mounted on the guide rail device body so as to move in the X-axis direction while being guided; a feed screw and an X-axis control motor for moving the carriage in the X-axis direction under numerical control; and a scribe head installed on the carriage.

4 Claims, 7 Drawing Sheets (51) Int. Cl.
*B26D 3/08* (2006.01)
*B28D 5/00* (2006.01)
*C03B 33/023* (2006.01)
*B28D 1/22* (2006.01)
*C03B 23/023* (2006.01)
*C03B 33/10* (2006.01)

(52) U.S. Cl.
CPC .......... *C03B 23/023* (2013.01); *C03B 33/027* (2013.01); *C03B 33/10* (2013.01); *C03B 33/105* (2013.01); *B65G 2249/04* (2013.01); *Y10T 83/0215* (2015.04); *Y10T 83/0341* (2015.04); *Y10T 83/0385* (2015.04)

(58) Field of Classification Search
CPC ..... C03B 33/023; C03B 33/027; C03B 33/10; C03B 33/105; B28D 1/226; B65G 2249/04; Y10T 83/0215; Y10T 83/0222; Y10T 83/0333; Y10T 83/0341; Y10T 83/0356; Y10T 83/037; Y10T 83/0385; Y10T 83/0393
USPC .................. 83/879, 880, 882–884, 886, 887
See application file for complete search history.

(56) References Cited

U.S. PATENT DOCUMENTS

| | | | |
|---|---|---|---|
| 4,667,555 A | 5/1987 | Lisec | |
| 4,726,500 A | 2/1988 | Rock | |
| 4,949,466 A | 8/1990 | Auer et al. | |
| 5,079,876 A * | 1/1992 | Zumstein | B24B 9/10 225/93.5 |
| 5,221,034 A * | 6/1993 | Bando | C03B 33/03 225/103 |
| 5,301,867 A | 4/1994 | Bando | |
| 5,381,713 A * | 1/1995 | Smith | C03B 33/027 83/582 |
| 5,616,064 A * | 4/1997 | Bando | B24B 9/10 225/2 |
| 6,218,793 B1 | 4/2001 | Bando | |
| 6,402,004 B1 | 6/2002 | Yoshikuni et al. | |
| 7,244,083 B1 * | 7/2007 | Gottschalk | B23Q 1/4804 408/130 |
| 7,302,761 B2 | 12/2007 | Loomis et al. | |
| 7,682,220 B2 | 3/2010 | Bando | |
| 7,717,311 B2 | 5/2010 | Nishio | |
| 7,818,981 B2 | 10/2010 | Lisec | |
| 2004/0211219 A1 | 10/2004 | Bando | |
| 2006/0137504 A1* | 6/2006 | Nishio | B28D 1/226 83/875 |
| 2007/0089304 A1 | 4/2007 | Loomis et al. | |
| 2012/0325070 A1 | 12/2012 | Bando | |

FOREIGN PATENT DOCUMENTS

| | | |
|---|---|---|
| JP | 09-188534 | 7/1997 |
| JP | 2000-264656 | 9/2000 |
| JP | 2003-292332 | 10/2003 |

OTHER PUBLICATIONS

International Search Report issued in International Application No. PCT/JP2009/001680 dated May 26, 2009.

Extended European Search Report dated Jul. 5, 2017 in European Application No. 09842931.9 (7 pages).

\* cited by examiner

GLASS PLATE SCRIBING APPARATUS

This application is a divisional of application Ser. No. 13/257,114, filed Sep. 16, 2011, which is the U.S. national phase of International Application No. PCT/JP2009/001680 filed Apr. 10, 2009 which designated the U.S. the entire contents of each of which are hereby incorporated by reference.

TECHNICAL FIELD

The present invention relates to a glass plate scribing method and a scribing apparatus in which a cutter wheel is rolled on a glass plate while applying pressure thereto to thereby scribe form a scribe line on the glass plate.

BACKGROUND ART

Patent Document 1: JP-A-H9-188534

With respect to glass plates for FPD (flat panel display) such as glass plate liquid crystal glass substrates for plasma television, the surface hardness of the glass plate is high, so that slippage of a cutter wheel is quite likely to occur at the time of scribing (scribe forming a cut line). At present, JP-A-H9-188534 is known as a technique for preventing this slippage.

In this Patent Document 1, projections are formed on the outer periphery of the cutter wheel to prevent the slippage of the cutter wheel, and the prevention of slippage is attained by causing the projections to bite into the glass plate during the rolling of the cutter wheel.

SUMMARY OF THE INVENTION

Problems that the Invention is to Solve

The above-described technique provides an attempt to remedy the biting into the surface of the glass plate. With any technique, however, the scribe formation of such a scribe line that allows an effective vertical crack to be obtained from a starting point of scribing is difficult. If the glass plate is bend-broken by applying a bending stress along the scribe line, splinters and the like are likely to occur starting from a discontinuous portion of a vertical crack at a starting point of scribing and its vicinity.

Accordingly, an object of the present invention is to provide a glass plate scribing method and a scribing apparatus which allow an effective vertical crack to be produced continuously from a starting point of scribing.

Means for Solving the Problems

In accordance with the present invention, there is provided a glass plate scribing method comprising the steps of: first scribe forming a dent at a scribe starting point at the time of a scribing start; and starting scribing from within the dent.

In accordance with the present invention, there is also provided a glass plate scribing method comprising the steps of: first causing a cutter wheel to finely rotate or swing in a state in which the cutter wheel is brought into pressure contact with a glass plate at a scribe starting point at the time of a scribing start, to thereby scribe form a dent at the starting point; and subsequently starting scribing from within the dent.

Further, in accordance with the present invention, there is provided a glass plate scribing method comprising the steps of: first causing a diamond scribe stylus provided separately from a cutter wheel to be extended toward and brought into pressure contact with a glass plate at a starting point at the time of a scribing start, to thereby form a dent; subsequently causing the cutter wheel to be lowered onto the dent; and starting scribing from within the dent.

Furthermore, in accordance with the present invention, there is provided a scribing apparatus comprising: a scribe head having a cutter wheel and adapted to scribe form a scribe line by rolling the cutter wheel in a state of being in pressure contact with a glass plate; and a diamond stylus unit which has a diamond scribe stylus and causes the diamond scribe stylus to be brought into pressure contact with the glass plate to thereby form a dent.

It should be noted that the size (diameter) of the aforementioned dent is preferably made equal to or smaller than the size of the scribe line, but may be made greater than the size of the scribe line.

Advantages of the Invention

At the time of a scribing start, a dent is first formed at a starting point, and the cutter wheel is made to start scribing from within the dent, so that an effective vertical crack is produced continuously from the starting point. For this reason, excellent bend-breaking is obtained over the entire scribe line including the starting point.

In addition, since the cutter wheel starts from within the dent, the center of the dent and the scribe line are aligned with each other.

MODE FOR CARRYING OUT THE INVENTION

Hereafter, a description will be given of the embodiments of the present invention with reference to the drawings. It goes without saying that since the scribing method in accordance with the present invention is carried out with a scribe head and a scribing apparatus, the scribing method in accordance with the present invention will be described through the embodiments of the scribing apparatus.

First Embodiment

Figure 1:
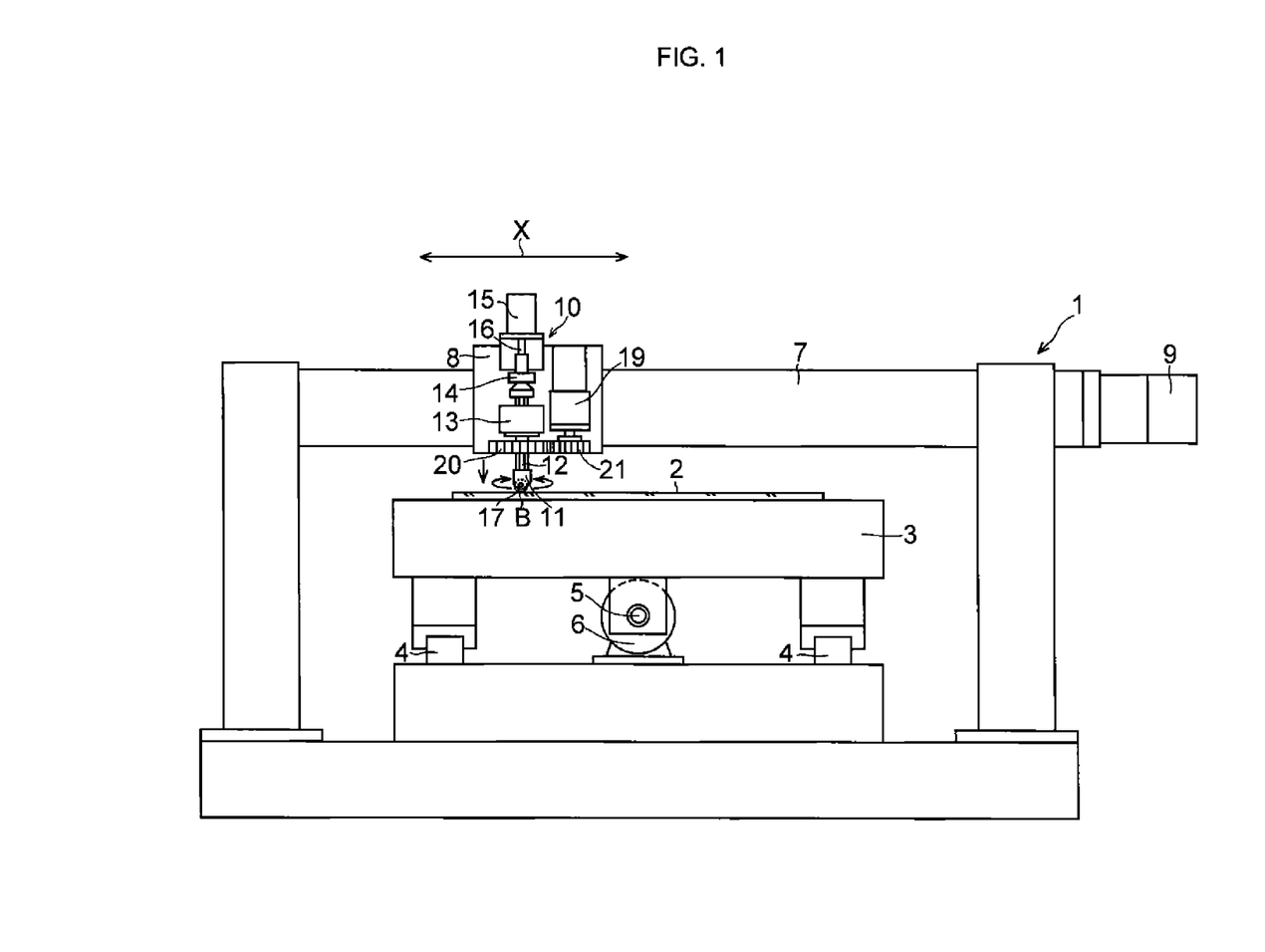
FIG. 1 is a schematic front elevational view of a scribing apparatus in one example in which one example of a scribing method in accordance with the present invention is being carried out.

FIG. 1 is a schematic front elevational view illustrating an example of the scribing apparatus and illustrating a part of the scribing method in accordance with the present invention.

Figure 2:
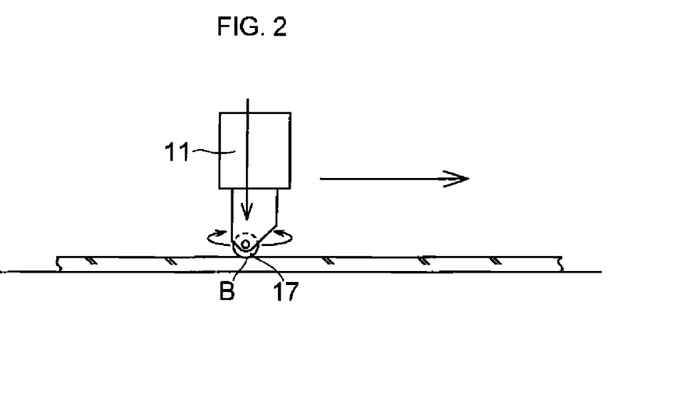
FIG. 2 is an explanatory diagram in which the scribing method in accordance with the present invention is being carried out with the scribing apparatus shown in FIG. 1.
Figure 3:
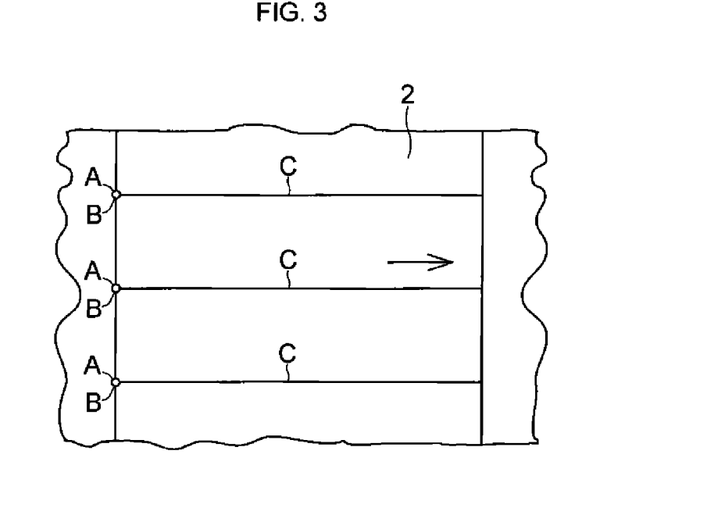
FIG. 3 is an explanatory plan view of scribe lines in one example in accordance with the scribing method of the present invention.
Figure 4:
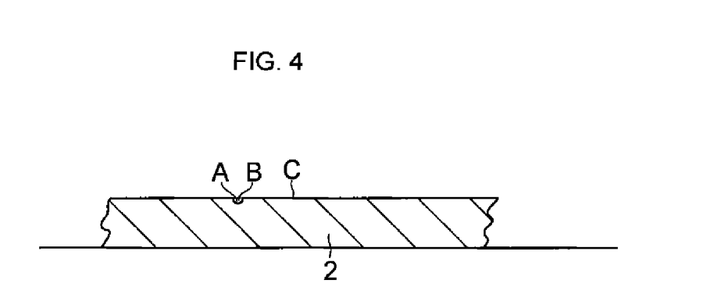
FIG. 4 is an explanatory cross-sectional view of an essential portion of scribing in the scribing method in accordance with the present invention.

FIGS. 2 to 4 are explanatory diagrams of the scribing method in accordance with the present invention.

In a scribing apparatus 1, the left-right direction in the drawings is assumed to be an X-axis direction, while a direction perpendicular to the plane of the drawing is assumed to be a Y-axis direction.

This scribing apparatus 1 is comprised of a horizontal table 3 on which a glass plate 2 is placed and fixed under vacuum suction; a parallel pair of guide rails 4 for guiding and supporting this table 3 so as to move horizontally in the Y-axis direction; a feed screw 5 and a Y-axis control motor 6 for moving the table along the guide rails 4 under scribe numerical control; a guide rail device body 7 installed above the table 3 along the X-axis direction; a carriage 8 mounted on this guide rail device body 7 so as to move in the X-axis direction while being guided; a conventional feed screw (not shown) and an X-axis control motor 9 for moving this carriage 8 in the X-axis direction under numerical control; and a scribe head 10 installed on the front surface of the carriage 8.

The scribe head 10 includes a spline shaft 12 having a cutter wheel holder 11 at a lower end thereof; a rotary spline unit 13 for holding this spline shaft 12 at the center so that the spline shaft 12 is vertically movable and is also rotated; and an air cylinder unit 15 which is coupled to an upper end of the spline shaft 12 by means of a free rotating joint 14.

The main body of the air cylinder unit 15 is, as a matter of course, mounted on the carriage 8, and a piston rod 16 is coupled to the spline shaft 12 by means of the aforementioned free rotating joint 14.

A cutter wheel 17 is provided in the aforementioned cutter wheel holder 11. The axis of the cutter wheel 17 is, as a matter of course, provided eccentrically (backwardly with respect to the advancing direction) with respect to the axis of the spline shaft 12.

The spline shaft 12 held in the rotary spline unit 13 is vertically moved within the rotary spline unit 13 in a Z-axis direction (perpendicularly with respect to the surface of the glass plate 2) by the air cylinder unit 15. Additionally, during scribing, air pressure is imparted to the cutter wheel 17 in an orthogonal direction to the surface of the glass plate 2.

In addition, the spline shaft 12 is rotatively driven by the rotary spline unit 13.

An angle control motor 19 is provided laterally of the rotary spline unit 13.

The rotary spline unit 13 has a drive gear 20 for rotating the spline shaft 12. As this drive gear 20 is coupled in meshing engagement with the gear 21 mounted on the angle control motor 19, the spline shaft 12 and, hence, the cutter wheel 17 is rotated under angle control by this angle control motor 19. Namely, the blade surface of the cutter wheel 17 is subjected to angular control so as to face the scribing direction.

Hereafter, a description will be given of a first embodiment of the scribing method in accordance with the present invention which is carried out by this scribing apparatus 1.

Each time immediately before starting the operation for forming a scribe line by rolling the cutter wheel 17 while applying air pressure thereto, the cutter wheel 17 is first lowered to a scribe starting point A, and is brought into pressure contact with the glass plate 2. In this state of pressure contact, the cutter wheel 17 is finely rotated or swung to thereby form a dent B at this starting point A. As shown in FIGS. 1 to 4, starting from within this dent B, the cutter wheel 17 is made to start scribing in the state of pressure contact, to thereby form a continuous scribe line C which started from the dent B.

Namely, this method is one in which each time the scribe line C is formed, the dent B is formed at the starting point A, and scribing is started from this dent B.

It should be noted that the size (diameter) of the aforementioned dent B is made equal to or smaller than the size of the scribe line C. In FIG. 3, the dent is depicted to be large for explanation's sake.

Thus, as scribing is effected from within the dent B formed by scribing at the starting point A, it is possible to produce a continuous vertical crack from the dent (starting point A) without the occurrence of slippage on the cutter wheel from the starting point A, thereby making it possible to obtain excellent bend-breaking.

In addition, since the cutter wheel 17 starts from the dent B, the center of the dent B and the scribe line C are aligned with each other.

Second Embodiment

Figure 5:
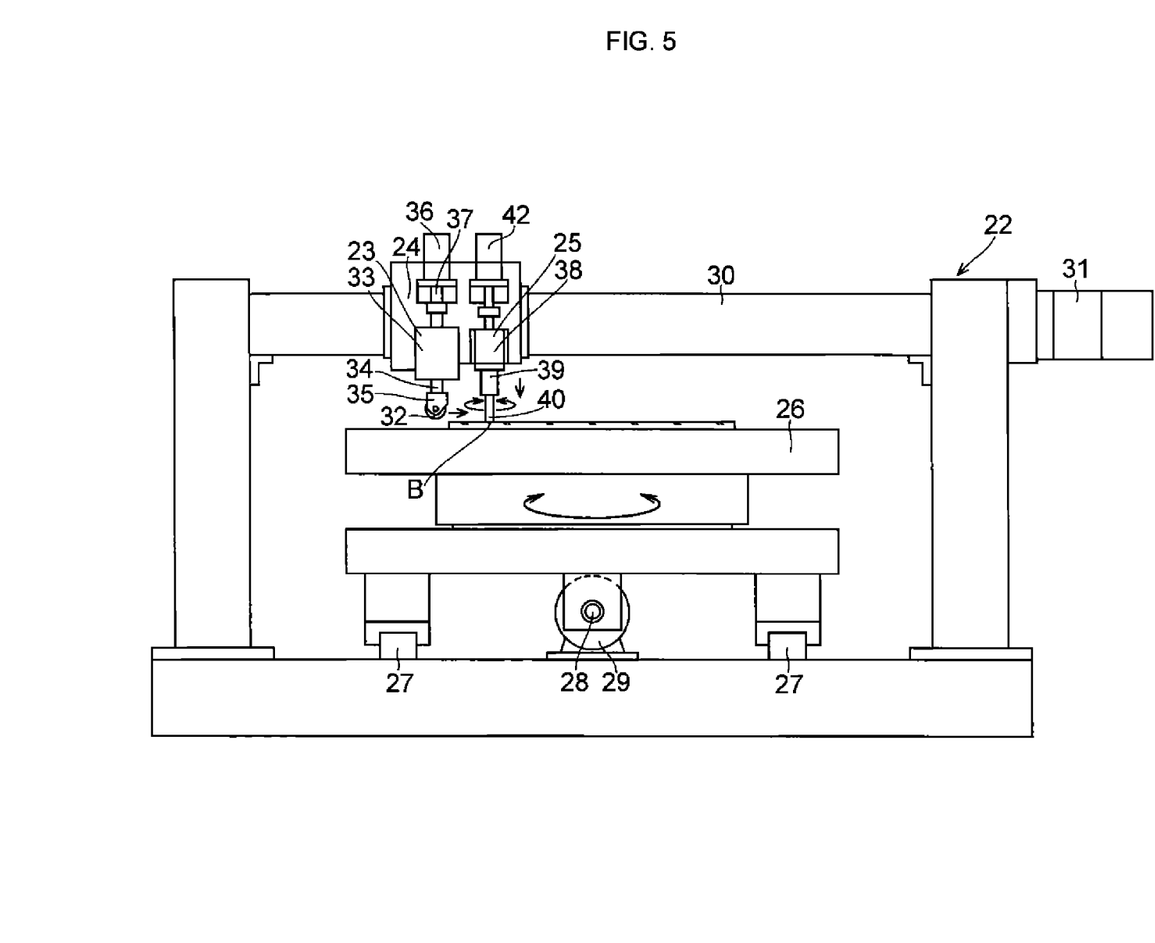
FIG. 5 is a schematic front elevational view of a scribing apparatus in another example in which another example of the scribing method in accordance with the present invention is being carried out.

FIG. 5 is a schematic front elevational view illustrating an example of the scribing apparatus for carrying out the second embodiment.

Figure 6:
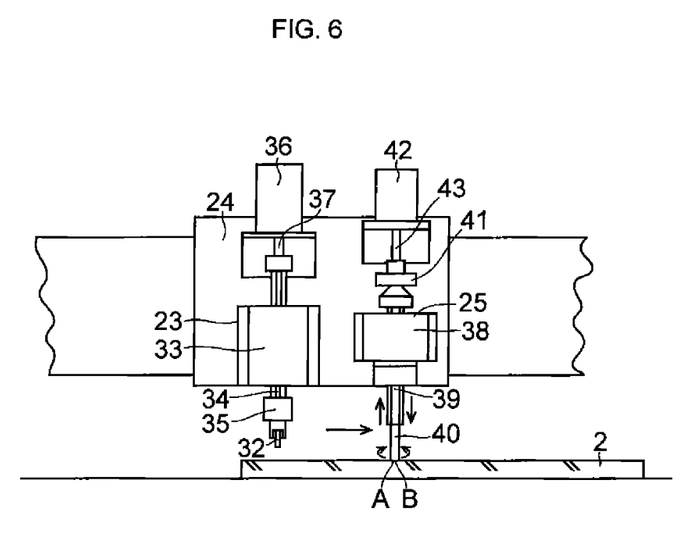
FIG. 6 is a front elevational view of a scribe head and a diamond stylus unit of the scribing apparatus which carries out the scribing method of the present invention shown in FIG. 5.

FIG. 6 is a front elevational view illustrating a scribe head 23 of a scribing apparatus 22 and illustrating a portion of the scribing method.

In the scribing apparatus 22, the left-right direction in the drawings is assumed to be the X-axis direction, while the direction perpendicular to the plane of the drawing is assumed to be the Y-axis direction.

This scribing apparatus 22 has a diamond stylus unit 25 disposed, in juxtaposition with the scribe head 23, on the front surface of a carriage 24 with the scribe head 23 mounted thereon.

This diamond stylus unit 25 is exclusively used in the scribe formation of the dent B on the glass plate 2 at the time of a scribing start. The scribing apparatus 22 in this embodiment is comprised of a table 26 on which the glass plate 2 placed thereon is fixed under vacuum suction, and which rotates horizontally; a parallel pair of guide rails 27 for guiding and supporting this table 26 so as to move horizontally in the Y-axis direction; a feed screw 28 and a Y-axis control motor 29 for moving the table 26 along the guide rails 27 under numerical control; a guide rail device body 30 installed above the table 26 along the X-axis direction; the carriage 24 mounted on this guide rail device body 30 so as to move in the X-axis direction while being guided; a conventional feed screw (not shown) and an X-axis control motor 31 for moving this carriage 24 in the X-axis direction under numerical control; the scribe head 23 installed on the front surface of the carriage 24; and the aforementioned diamond stylus unit 25 similarly disposed on the front surface of the carriage 24 in lateral juxtaposition with the scribe head 23. The scribing apparatus 22 is not provided with an angle control unit for rotating a cutter wheel 32 about an axis perpendicular to the glass plate 2. This scribing apparatus 22 effects scribing in the X-axis direction along the guide rail device body 30.

As a matter of course, this scribe head 23 causes the cutter wheel 32 to roll in a state of being brought into pressure contact with the glass plate 2 by means of air pressure, to thereby scribe form a scribe line. Namely, the scribe head 23 includes a slide bush body 33 mounted on the front surface of the carriage 24, a vertically moving body 34 held by this slide bush body 33 so as to be vertically movable, a cutter wheel holder 35 provided at a lower end of this vertically moving body 34, and an air cylinder unit 36 coupled to an upper end of the vertically moving body 34.

Further, the cutter wheel holder 35 is provided with the cutter wheel 32. An upper end of the vertically moving body 34 is coupled to a piston rod 37 of the air cylinder unit 36.

The vertically moving body 34 is vertically moved by the air cylinder unit 36, the cutter wheel 32 is brought into pressure contact with the glass plate 2 by receiving pressure from the air cylinder unit 36 by means of the vertically moving body 34 during scribing, and is thereby rolled in conjunction with the movement of the carriage 24 to effect scribing.

Meanwhile, the diamond stylus unit 25 comprises a DD motor 38 having a hollow shaft mounted on the front surface of the carriage 24; a spline shaft 39 held slidably in the hollow shaft to receive rotative drive; a diamond scribe stylus 40 provided at a lower end of this spline shaft 39; and an air cylinder unit 42 coupled to an upper end of the spline shaft 39 by means of a free rotating joint 41, a piston rod 43 of the air cylinder unit 42 being coupled to the spline shaft 39.

In terms of the operation of the aforementioned diamond stylus unit 25, as the spline shaft 39 is extended toward the glass plate 2 by the air cylinder unit 42, the diamond scribe stylus 40 at the distal end is brought into pressure contact with the glass plate 2. At the same time, the diamond scribe stylus 40 at the distal end is finely rotated by driving the DD motor 28, thereby forming the dent B.

It should be noted that, instead of the vertical movement by the aforementioned air cylinder unit 42, the diamond scribe stylus 40 or the entire diamond stylus unit 25 may be moved vertically by a linear motor or a servo motor.

The scribing method which is carried out by this scribing apparatus 22 will be described below.

Each time a scribe line is scribe formed on the glass plate 2, at the time of its scribing start the diamond stylus unit 25 is first positioned at the scribe starting point A, and this diamond stylus unit 25 is operated. The diamond scribe stylus 40 at the distal end is brought into pressure contact at the starting point A by extending the spline shaft 39, and this diamond scribe stylus 40 is finely rotated or swung, thereby forming the dent B at this starting point A.

Simultaneously with the formation of the dent B, the diamond scribe stylus 40 is withdrawn. Next, the cutter wheel 32, in turn, is moved to and positioned at the position (starting point A) where the dent B has been formed. Its cutter wheel 32 is then extended and brought into pressure contact with the glass plate 2 within the dent B. In this state, scribing is started from within the dent B, and the scribe line C is scribe formed continuously from the dent B.

It should also be noted that the size (diameter) of the aforementioned dent B is normally made equal to or smaller than the size of the scribe line C, but may be made greater than the same.

Third Embodiment

Figure 7:
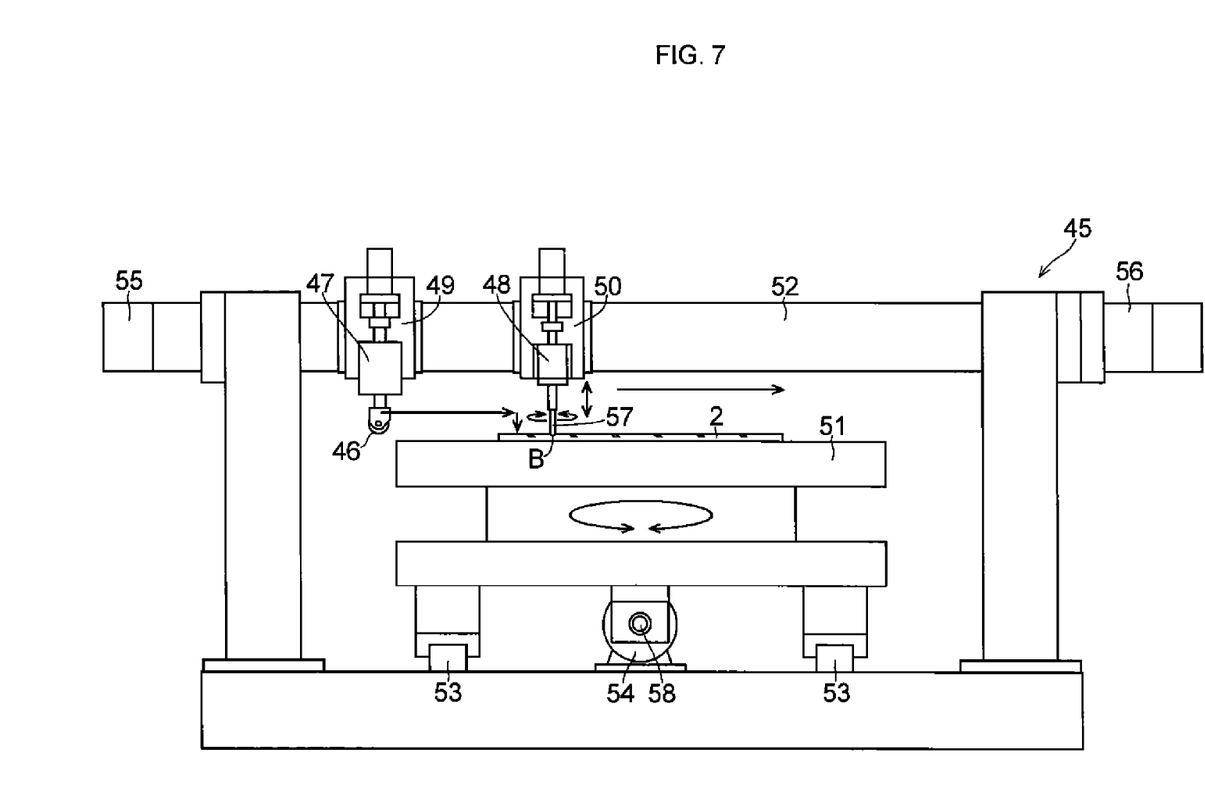
FIG. 7 is a schematic front elevational view of an scribing apparatus in still another example in which still another example of the scribing method in accordance with the present invention is being carried out.

FIG. 7 is a schematic front elevational view illustrating an example of a scribing apparatus 45 for carryout out the third embodiment.

In this scribing apparatus 45, a scribe head 47 having a cutter wheel 46 and adapted to scribe form the scribe line C by rolling the cutter wheel 46 in a state of being in pressure contact with the glass plate 2, and a diamond stylus unit 48 for exclusively effecting the scribe formation of the dent B on the glass plate 2 are made independent of each other and are respectively mounted on separate carriages 49 and 50.

The respective carriages 49 and 50 are independently mounted on a guide rail device body 52 installed above a table 51, and are adapted to move independently of each other. Namely, the scribe head 47 and the diamond stylus unit 48 move independently of each other.

In addition, the respective structures and the operation of the scribe head 47 and the diamond stylus unit 48 may be the same as the structures and operation of the scribe head 23 and the diamond stylus unit 25 of the scribing apparatus 22 shown in the foregoing second embodiment.

Also in the same way as in the second embodiment, the scribing apparatus 45 is comprised of the table 51 on which the glass plate 2 placed thereon is fixed under vacuum suction, and which rotates horizontally; a parallel pair of guide rails 53 for guiding and supporting this table 51 so as to move horizontally in the Y-axis direction; a feed screw 58 and a Y-axis control motor 54 for moving the table 51 along the guide rails 53 under numerical control; the guide rail device body 52 installed above the table 51 along the X-axis direction; the Z-axis carriages 49 and 50 mounted on this guide rail device body 52 so as to move in the X-axis direction while being guided; a conventional feed screw (not shown) and an X-axis control motor 55 for moving one carriage 49 in the X-axis direction under numerical control; a conventional feed screw (not shown) and another X-axis control motor 56 for moving the other carriage 50 similarly in the X-axis direction under numerical control; the aforementioned scribe head 47 installed on the front surface of the one carriage 49; and the aforementioned diamond stylus unit 48 disposed on the front surface of the other carriage 50.

As a matter of course, in the same way as the diamond stylus unit 25 in the second embodiment the diamond stylus unit 48 has a diamond scribe stylus 57 at its distal end, and this diamond scribe stylus 57 is adapted to extend toward the glass plate 2, is brought into pressure contact therewith, is finely rotated or swung to thereby scribe form the dent B.

The scribing method which is carried out by this scribing apparatus 45 will be described below.

Each time a scribe line is scribe formed on the glass plate 2, at the time of its scribing start the diamond stylus unit 48 is first moved to and positioned at the scribe starting point A, and this diamond stylus unit 48 is immediately operated to thereby scribe form the dent B at the starting point A. After the formation of the dent B, the diamond stylus unit 48 immediately returns to its original position. Next, the scribe head 47, in turn, is moved to and positioned at the position (starting point A) where the dent B has been formed. Its cutter wheel 46 is then extended and brought into pressure contact with the glass plate 2 within the dent B. In this state, scribing is started from within the dent B, and the scribe line C is scribe formed continuously from the dent B.

It goes without saying that the size (diameter) of the aforementioned dent B is made equal to or smaller than the size of the scribe line C, but may be made greater than the scribe line.

Fourth Embodiment

Figure 8:
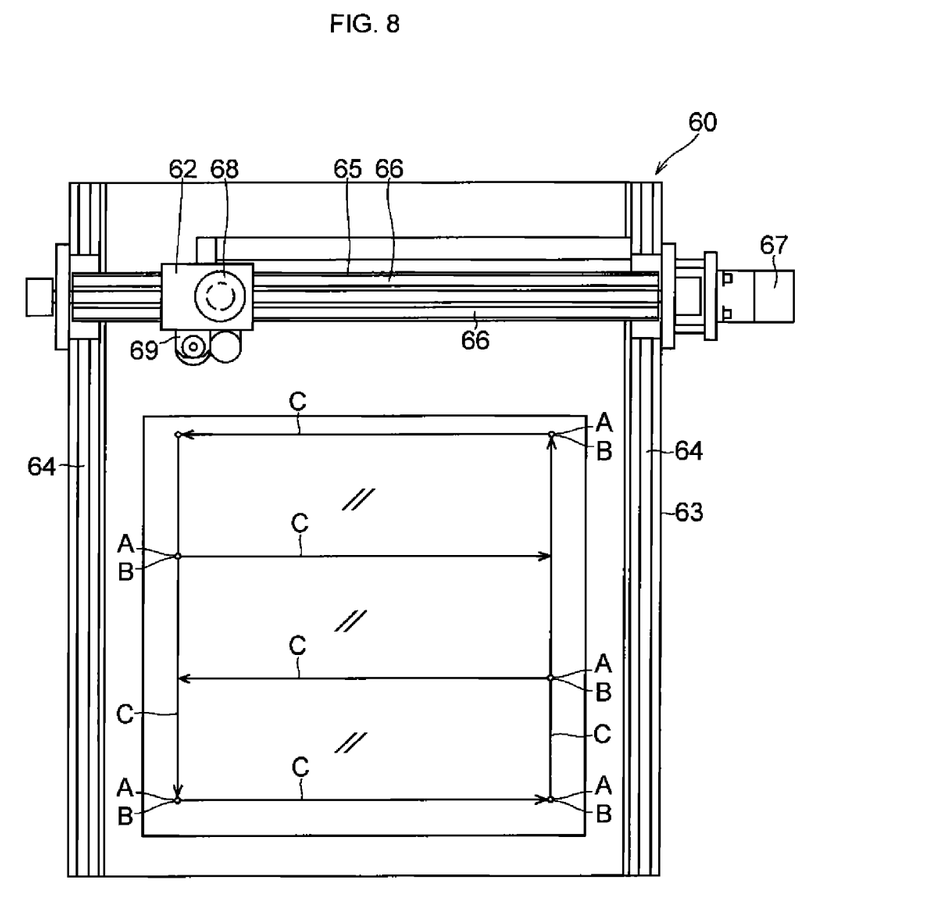
FIG. 8 is a schematic plan view of a glass plate cutting apparatus serving as a scribing apparatus in which a further example of the scribing method in accordance with the present invention is being carried out.
Figure 9:
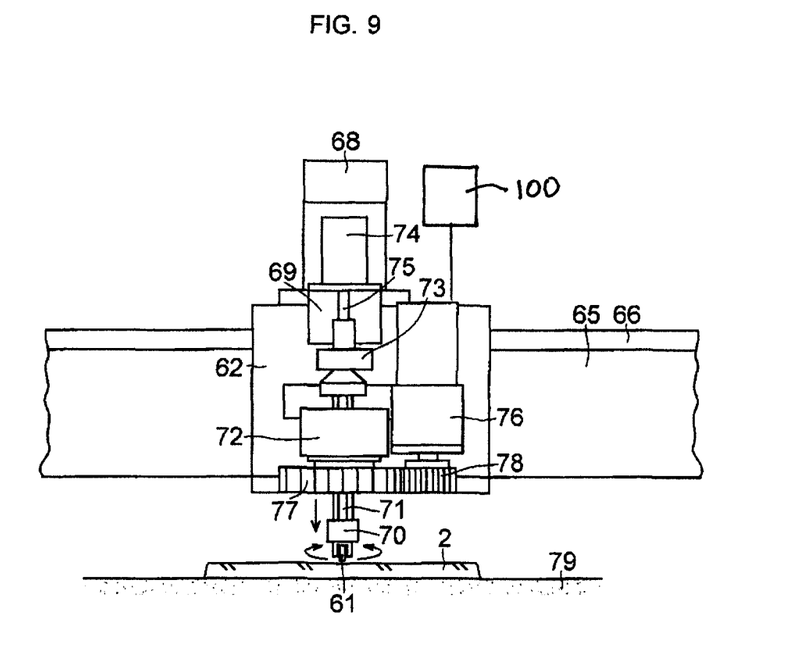
FIG. 9 is a front elevational view of a cutter head which is carrying out the scribing method of the present invention shown in FIG. 8.

FIGS. 8 and 9 illustrate an NC control cutting apparatus 60 which is also a glass plate scribing apparatus for carrying out a fourth embodiment of the present invention.

In this glass plate cutting apparatus 60, a carriage 62 provided with a cutter wheel 61 moves in a planar coordinate system by being subjected to NC control. Accordingly, the cutter wheel 61 moves by being subjected to NC control in an orthogonal coordinate system.

As shown in FIG. 8, a pair of guide rails 64 are provided on a base 63 along the X axis, and a moving base 65 is moved in the X-axis direction by the guide rails 64. Further, a pair of guide rails 66 extending along the Y axis are provided on this moving base 65. The aforementioned carriage 62 is movable in the Y-axis direction by these guide rails 66. The moving base 65 is moved in the X-axis direction under numerical control by an X-axis control motor 67 and a conventional meshing rack device or a conventional feed screw (not shown).

The carriage 62 on the moving base 65 is moved in the Y-axis direction under numerical control by an Y-axis control motor 68 and a conventional meshing rack device or a conventional feed screw (not shown).

Accordingly, the carriage 62 is positionally controlled in the X-axis direction and the Y-axis direction, and the cutter wheel 61 mounted on the carriage 62 moves along a pre-programmed locus of movement. As shown in FIG. 9, a cutter head 69, which is also a scribe head, is mounted on the front surface of the carriage 62.

The cutter head 69 includes a spline shaft 71 having a cutter wheel holder 70 at a lower end thereof; a rotary spline unit 72 for holding this spline shaft 71 at the center so that the spline shaft 71 is vertically movable and is also rotated; and an air cylinder unit 74 which is coupled to an upper end of the spline shaft 71 by means of a free rotating joint 73. The main body of the air cylinder unit 74 is, as a matter of course, mounted on the carriage 62, and a piston rod 75 is coupled to the spline shaft 71 by means of the aforementioned free rotating joint 73.

The cutter wheel 61 is provided in the aforementioned cutter wheel holder 70. The axis of the cutter wheel 61 is, as a matter of course, provided eccentrically (backwardly with respect to the advancing direction) with respect to the axis of the spline shaft 71.

The spline shaft 71 held in the rotary spline unit 72 is vertically moved within the rotary spline unit 72 in the Z-axis direction (perpendicularly with respect to the surface of the glass plate 2) by the air cylinder unit 74.

Additionally, during scribing, air pressure is imparted to the cutter wheel 61 in an orthogonal direction to the surface of the glass plate 2. In addition, the spline shaft 71 is rotatively driven by the rotary spline unit 72. An angle control motor 76 is provided laterally of the rotary spline unit 72.

The rotary spline unit 72 has a drive gear 77 for rotating the spline shaft 71. As this drive gear 77 is coupled in meshing engagement with a gear 78 mounted on the angle control motor 76, the spline shaft 71 and, hence, the cutter wheel 61 is rotated under angle control by this angle control motor 76.

Namely, the blade surface of the cutter wheel 61 is subjected to angular control so as to face the scribing direction. The glass plate 2 is placed on a table 79 provided on the base 63, and is sucked and fixed, as required.

Hereafter, a description will be given of the scribing method in accordance with the present invention which is carried out by this scribing apparatus 60.

Each time immediately before starting the operation for scribe forming a scribe line by rolling the cutter wheel 61 while applying air pressure thereto, the cutter wheel 61 is first lowered to the scribe starting point A, and is brought into pressure contact with the glass plate 2. In this state of pressure contact, the cutter wheel 61 is finely rotated or swung via angle control motor 76, under the control of a controller 100 (FIG. 9), to thereby form the dent B at this starting point A. Next, starting from within this dent B, the cutter wheel 61 is made to start scribing in the state of pressure contact, to thereby form the continuous scribe line C which started from the dent B.

This method is one in which each time the scribe line C is formed, the dent B is scribe formed at the starting point A, and scribing is started from this dent B.

Thus, as scribing is effected from within the dent B formed by scribing at the starting point A, it is possible to produce a continuous vertical crack from the dent (starting point A) without the occurrence of slippage on the cutter wheel from the starting point A, thereby making it possible to obtain excellent bend-breaking.

In addition, since the cutter wheel 61 starts from the dent B, the center of the dent B and the scribe line C are aligned with each other.

The invention claimed is:

1. A scribing apparatus comprising:
   a scribe head having a cutter wheel, the cutter wheel being rotatable about a first axis for scribe forming a scribe line in a fragile plate;
   means for rotating the cutter wheel about a second axis that is orthogonal to the first axis; and a controller that brings said cutter wheel into pressure contact with the fragile plate at a scribe starting point and forms a dent in the fragile plate at the scribe starting point using said means for rotating the cutter wheel, and that subsequently starts scribing the fragile plate by moving said cutter wheel, which is in pressure contact with the fragile plate, along the fragile plate from within said dent after the dent is formed at the scribe starting point.

2. A scribing apparatus comprising: a scribe head, wherein said scribe head has:
   a cutter wheel that is rotatable about a horizontal axis for scribe forming a scribe line in a fragile plate,
   a spline shaft which is coupled to the cutter wheel,
   a rotary spline unit which holds the spline shaft such that the spline shaft is freely vertically movable and such that the spline shaft is rotatively drivable by the rotary spline unit,
   an air cylinder unit having a piston rod which vertically moves by air pressure imparted thereto, and
   a free rotating joint which couples the spline shaft with the piston rod;
   means for rotating the cutter wheel about a vertical axis; and
   a controller that brings said cutter wheel into pressure contact with the fragile plate at a scribe starting point and forms a dent in the fragile plate at the scribe starting point using said means for rotating the cutter wheel, and that subsequently starts scribing the fragile plate by moving said cutter wheel, which is in pressure contact with the fragile plate, along the fragile plate from within said dent after the dent is formed at the scribe starting point.

3. A scribing apparatus according to claim 2, wherein said means for rotating the cutter wheel comprises an angle control motor having a shaft that is offset and parallel to the spline shaft, the angle control motor being configured to rotate the spline shaft.

4. A scribing apparatus according to claim 3, wherein the angle control motor includes a first gear that meshes with a second gear on the spline shaft, the second gear being located between the rotary spline unit and the cutter wheel.

* * * * *